Nov. 22, 1955   O. R. LONG   2,724,326
ORANGE JUICE EXTRACTOR
Filed Oct. 10, 1952   2 Sheets-Sheet 1

Nov. 22, 1955    O. R. LONG    2,724,326
ORANGE JUICE EXTRACTOR
Filed Oct. 10, 1952    2 Sheets—Sheet 2

2,724,326

ORANGE JUICE EXTRACTOR

Oliver R. Long, Cottage City, Md.

Application October 10, 1952, Serial No. 314,095

2 Claims. (Cl. 100—98)

The invention relates to improvements in devices for extracting the juice from oranges and other fruits and vegetables capable of yielding their natural juices upon the application of mechanical pressure. Its purpose is to provide a light weight, manually powered device that may be used in the home, in restaurants, or wherever portability is desirable.

An object is to provide a small, durable device that will receive a whole orange and both cut and press the juice therefrom by mechanical means.

The uses of this device are not limited to oranges, but include other fruits and vegetables which contain natural juices capable of being removed by the application of mechanical pressure.

One form of the invention is illustrated in the accompanying drawings as follows.

Figure 1:
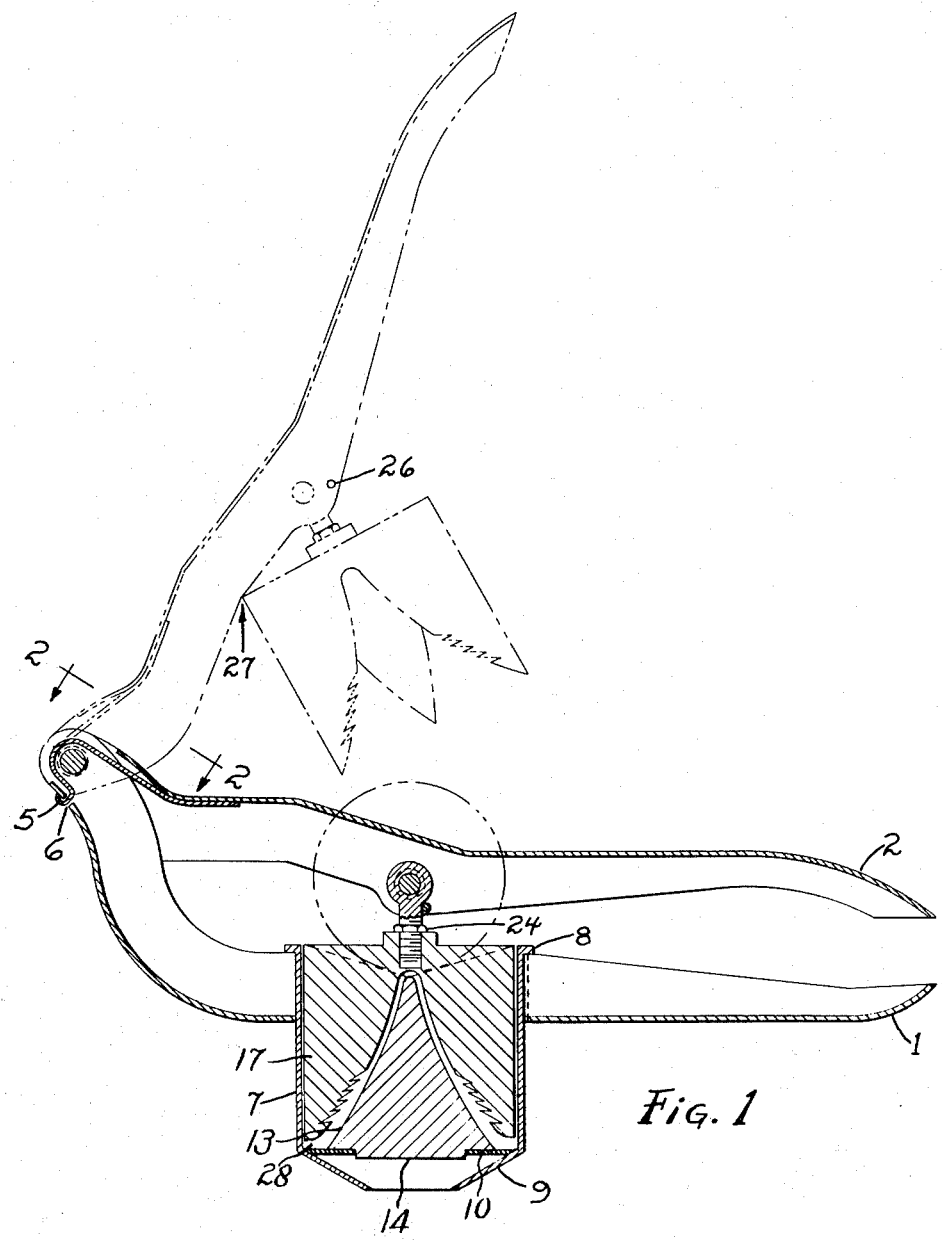
Figure 1 is a vertical section of the entire juice extractor, showing the upper handle in raised position in broken lines, and in lower position in full lines.
Figure 6:
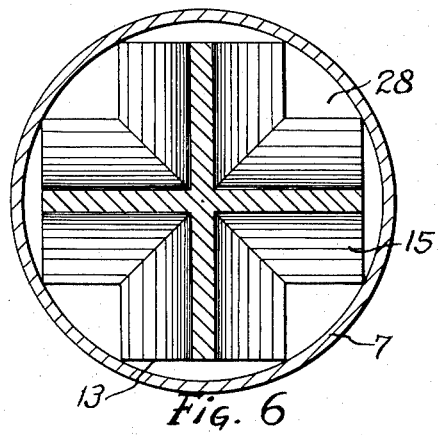
Figure 6 is a view in section of the cutting unit taken on the line 6—6, Figure 5, and positioned within the canister also shown in cross section.
Figure 8:
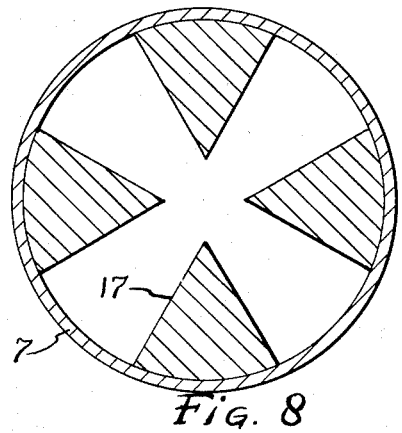
Figure 8 is a sectional plan view of the pressing unit taken on the line 8—8, Figure 7, and positioned within the canister also shown in cross section.
Figure 5:
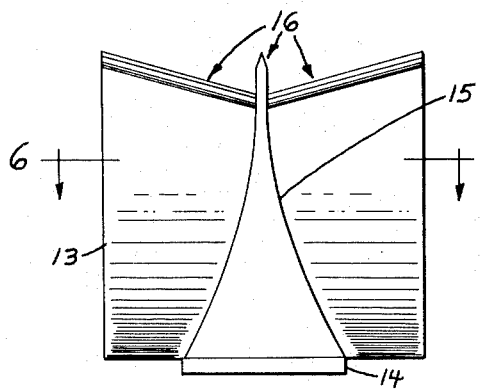
Figure 5 is a vertical view of the cutting unit.
Figure 7:
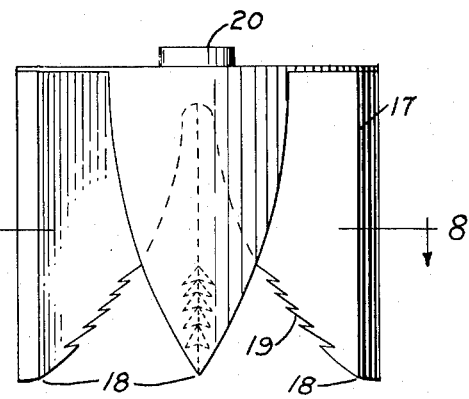
Figure 7 is a vertical view of the pressing unit.
Figure 4:
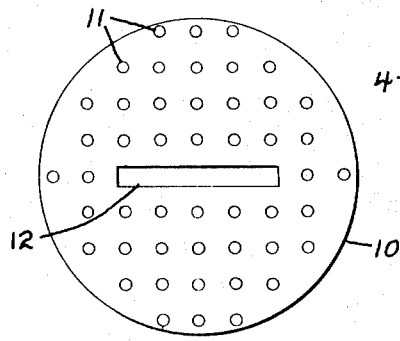
Figure 4 is a plan view of the strainer plate.
Figure 2:
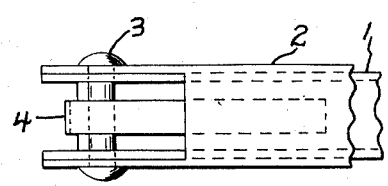
Figure 2 is a partial view of the handle pivotal joint and return spring taken on the line 2—2, Figure 1.
Figure 3:
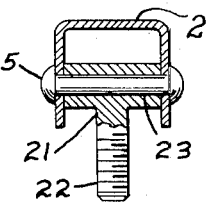
Figure 3 is an end view in section of the pressing unit pivotal joint.

The lower handle 1 is secured to the upper handle 2 by means of a rivet 3 about which rivet said upper and lower handles pivot. The upper handle 2 is held in the raised or open position, shown by dash lines in Figure 1, by a flat spring 4 having a hook 5 on one end which is hooked through a slot 6 in the lower handle 1, and having its other end forcing the upper handle 2 towards the open position.

A hollow, cylindrical canister 7 is held in a circular opening in the lower handle 1 by means of a flange 8 on the upper end of said canister. The lower end 9, of said canister 7 is formed in the shape of a conical taper thereby tightly supporting by means of a force fit to prevent rotation a flat circular strainer plate 10 having numerous perforations 11, and a rectangular slot 12.

A cutting member 13 fits into the canister 7, and is prevented from rotating within said canister by means of a projection 14 on the bottom of said cutting member 13, which fits into the slot 12 in the strainer plate 10. The cutting portion of said cutting member 13, consists of four blades 16, forming ninety degree angles to each other and intersecting at a center point slightly lower than the outer extremities of the blades. Curving downward from the edge of each blade 16, are concave surfaces or wedges 15 against which wedge sections of an orange are pressed.

The pressing unit 17 consists of four pressing extensions 18 pointing downward with each said extension being of the approximate size and shape of the compartment spaces 28 between intersecting concave surfaces 15 of the cutting unit 13 and the canister 7. The four pressing extensions 18 are arranged so as to permit them to simultaneously fit into the four compartment spaces between intersecting concave surfaces 15 of the cutting unit 13 and the canister 7. The invention is not limited to a device with four extensions 18 and blades 16, and may have a greater or lesser number of extensions 18 and blades 16, with a proportionate decrease or increase in the angle between adjacent blades. The lower inside surface of each pressing extension 18 has a vertical series of upwardly pointing teeth 19 for removing the wedge sections of pressed orange from the spaces between the concave surfaces 15 of the cutting unit 13. The upper horizontal surface of the pressing unit 17 is tapped at 20 to receive pivot member 21 which is threaded at its lower end 22 and has a horizontal hole 23 through its upper end. A lock nut 24 on the pivot member 21 permits the threaded end 22 to be held firmly in place at variable depths within the tapped hole 20.

A rivet 25 through the upper handle 2 and the horizontal hole 23 permits a pivotal motion of the pressing unit 17, about said rivet 25 in a vertical plane passing through the cutting unit 13. The said pivotal motion of the pressing unit 17 is limited in the outward direction by a stop 26 on the upper handle 2, and is limited in the inward direction by contact with a projection 27 on the upper handle 2.

The juice extractor is operated by raising the upper handle 2, placing a whole orange on top of the blades 16, and then lowering the upper handle 2, thereby causing the pressing unit 17 to force the orange down onto the blades 16 cutting said orange into wedge-shaped sections. The pressing unit 17 is guided onto the said orange and then into the canister 7 by means of projection 27 on the upper handle 2 and the stop 26. The pressing extensions 18 follow the said sections of orange into the canister 7 between the blades 16 and press the juice from them by forcing them against the concave surfaces 15. The said juice runs through the perforations 11 in the strainer plate 10 and then out the bottom of the canister 7 where it may be collected. Raising the upper handle 2 causes the pressing extensions 18 to extract the pressed sections of orange by means of the upwardly pointing teeth 19 which dig into the peel of said sections of orange.

This application is not limited to the specific embodiment shown which is merely presented for illustrative purposes, and it includes any variations within the scope of the invention that would be devised by persons skilled in the art.

I claim:

1. In a device for extracting the juice from oranges, the combination of a cutting unit having a base portion and a plurality of radially spaced cutting edges inclining upwardly and outwardly therefrom, with each of said edges defining the upper extremity of the two opposite surfaces of a wedge having said surfaces diverging from the vertical plane and extending downwardly to said base portion, a canister fitting closely around the outer radial extremities of said wedges and having a floor portion upon which said base portion rests, the inner walls of said canister and the diverging surfaces of said wedges defining a plurality of compartment spaces providing squeezing zones, and a pressing unit movable down upon said cutting unit and having downwardly pointing extensions equal in number to said cutting edges, said pressing unit extensions having substantially the size and shape of the said compartment spaces whereby an orange placed on said cutting edges may be severed and have the juice extracted therefrom by being squeezed between the said extensions and wedges, and said extensions being adapted to pass between two of said cutting edges into said compartmented spaces when said pressing unit is moved down upon said cutting unit.

2. In a device for extracting the juice from oranges, the combination of cutting means comprising several knife units, radially spaced with each having a cutting edge facing upwardly, and inclining as it radiates outwardly, and having sides diverging from the vertical plane as they extend downwardly from said cutting edge, pressing means comprising finger-like extensions pointing downwardly, equal in number to the said knife units and positioned so as to permit each said extension to fit between two of said knife units simultaneously with the others, said extensions having pressing surfaces shaped to conform substantially to the contour of said knife sides and having upwardly pointing teeth on their inner surfaces, said cutting means and pressing means mounted for reciprocation toward and away from each other whereby an orange placed therebetween may be forced onto the cutting means to be severed and have the juice squeezed therefrom, a cylindrical canister placed around the radial extremities of said knife units, and a flat strainer plate held horizontally in the lower end of said canister, said plate having numerous small perforations of a size to permit the passage of orange juice while excluding the pulp and fibers, and said plate being made with a longitudinal slot to receive a longitudinal projection on the bottom of said cutting means to support said cutting means and to prevent rotation of said cutting means.

References Cited in the file of this patent
UNITED STATES PATENTS

| Number | Name | Date |
|---|---|---|
| 28,967 | Chichester | July 3, 1860 |
| 172,505 | Sammis | Jan. 18, 1876 |
| 385,851 | Easley | July 10, 1888 |
| 587,197 | Gilroy | July 27, 1897 |
| 620,047 | Neal | Feb. 21, 1899 |
| 626,626 | Middlekauff | June 6, 1899 |
| 1,628,779 | Israelson | May 17, 1927 |
| 2,495,770 | Rivet | Jan. 31, 1950 |
| 2,581,294 | Read et al. | Jan. 1, 1952 |
| 2,591,510 | Clark | Apr. 1, 1952 |